United States Patent
King et al.

(10) Patent No.: US 10,230,261 B2
(45) Date of Patent: Mar. 12, 2019

(54) POWER CONTROL CIRCUITS AND RELATED UNINTERRUPTIBLE POWER SUPPLY SYSTEMS

(71) Applicant: Eaton Corporation, Cleveland, OH (US)

(72) Inventors: Gary Bradley King, Raleigh, NC (US); Mengbin Ben Yang, Raleigh, NC (US); David Zheng, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 641 days.

(21) Appl. No.: 14/944,523

(22) Filed: Nov. 18, 2015

(65) Prior Publication Data
US 2017/0141609 A1    May 18, 2017

(51) Int. Cl.
| | |
|---|---|
| *H02J 9/06* | (2006.01) |
| *H02M 7/04* | (2006.01) |
| *H02M 7/44* | (2006.01) |
| *H02J 7/00* | (2006.01) |
| *H02H 9/02* | (2006.01) |

(Continued)

(52) U.S. Cl.
CPC .............. *H02J 9/061* (2013.01); *H02H 9/025* (2013.01); *H02J 7/007* (2013.01); *H02J 9/062* (2013.01); *H02M 5/458* (2013.01); *H02M 7/00* (2013.01); *H02M 7/04* (2013.01); *H02M 7/44* (2013.01)

(58) Field of Classification Search
CPC .. H02J 9/061; H02J 9/062; H02J 7/007; H02J 9/06; H02J 7/00; H02M 5/458; H02M 7/00; H02M 7/44; H02M 7/04; H02H 9/025; H02H 9/02
See application file for complete search history.

(56) References Cited

U.S. PATENT DOCUMENTS

| | | | |
|---|---|---|---|
| 3,683,264 | A | 8/1972 | Schieman et al. |
| 3,818,307 | A | 6/1974 | Hamilton et al. |
| 5,815,389 | A | 9/1998 | Plow et al. |

(Continued)

FOREIGN PATENT DOCUMENTS

| | | |
|---|---|---|
| CN | 101834467 A | 9/2010 |
| CN | 203562765 U | 4/2014 |

(Continued)

OTHER PUBLICATIONS

Notification of Transmittal of the International Search Report and the Written Opinion of the International Searching Authority, or the Declaration, PCT/US2016/062472, dated Mar. 6, 2017, 15 pages.

(Continued)

*Primary Examiner* — Jared Fureman
*Assistant Examiner* — Emmanuel R Dominique
(74) *Attorney, Agent, or Firm* — Ward and Smith, P.A.

(57) ABSTRACT

Power control systems are provided including a digital controller configured to control gating mechanism for power switches responsive to an input from a power conversion circuit. The digital controller includes a conversion circuit, a modulation circuit and a gating control circuit. The system further includes an analog circuit comprising a filter, a current limiter and a compare circuit. The current limiter is configured to control a magnitude of a current pulled through a power convertor during a device switching operation.

15 Claims, 6 Drawing Sheets

(51) Int. Cl.
    *H02M 7/00*     (2006.01)
    *H02M 5/458*    (2006.01)

(56) References Cited

U.S. PATENT DOCUMENTS

| | | |
|---|---|---|
| 6,967,852 B2 | 11/2005 | Hamilton |
| 6,969,976 B1 | 11/2005 | Broach et al. |
| 7,436,643 B2 | 10/2008 | van den Berg et al. |
| 7,545,132 B2 | 6/2009 | Borowy et al. |
| 7,855,539 B1 | 12/2010 | Wong et al. |
| 2006/0000460 A1* | 1/2006 | Masters ............... F02P 3/0456 123/609 |
| 2008/0024950 A1 | 1/2008 | Jagota et al. |
| 2014/0167503 A1* | 6/2014 | Redpath ................ H02J 9/06 307/23 |
| 2014/0176106 A1 | 6/2014 | Toosky et al. |

FOREIGN PATENT DOCUMENTS

| | | |
|---|---|---|
| DE | 3403060 A1 | 10/1984 |
| GB | 1 510 904 | 5/1978 |
| JP | 2005-86885 A | 3/2005 |
| JP | 2005-176567 A | 6/2005 |
| WO | WO 03/044939 A1 | 5/2003 |
| WO | WO 2013/142312 A1 | 9/2013 |
| WO | WO 2014/146852 A2 | 9/2014 |
| WO | WO 2014/166660 A1 | 10/2014 |

OTHER PUBLICATIONS

Notification Concerning Transmittal of International Preliminary Report on Patentability, PCT/US2016/062472, dated May 31, 2018, 7 pages.

\* cited by examiner

POWER CONTROL CIRCUITS AND RELATED UNINTERRUPTIBLE POWER SUPPLY SYSTEMS

FIELD

The inventive concept relates generally uninterruptible power supply (UPS) systems and, more particularly, power control circuits for use with UPS systems.

BACKGROUND

Uninterruptible power supply (UPS) systems are commonly used in installations such as data centers, medical centers and industrial facilities. UPS systems may be used in such installations to provide backup power to maintain operation of computer, medical devices and other critical equipment in event of failure of a primary utility supply. These UPS systems commonly have an "on-line" configuration including a rectifier and inverter coupled by a DC link that is also coupled to a backup power source, such as a battery. Other UPS configurations may also be used, such as standby and line-interactive configurations.

UPS systems may be necessary in situations where power fluctuations or outages frequently occur because they can provide backup power circuitry that keeps vital systems operational in case the power supply is cut off. Under conditions involving short fluctuations or voltage disruption, the UPS can maintain constant power to keep loads running, and if electrical failure occurs, it can activate reserve power to keep systems operating until they can be safely shut down. In addition, these UPS systems can often also reduce the risk posed by harmonic disruptions and line transients. Thus, an effective UPS usually includes several of the following features: regulated output voltage with low harmonic distortion unaffected by input voltage or load changes; an input current with reduced harmonic distortion; a low degree of electromagnetic interference and acoustic noise; minimal transition times between normal and backup operations; high levels of reliability and efficiency; and relatively low cost, weight, and size requirements Thus, put simply, a UPS is a device that provides backup power when utility power fails, either long enough for critical equipment to shut down gracefully so that no data is lost, or long enough to keep required loads operational until a generator comes online; and conditions incoming power so that all-too-common sags and surges don't damage sensitive electronic gear.

SUMMARY

Some embodiments of the inventive concept provide power control systems. The system includes a digital controller configured to control gating mechanisms for power switches responsive to an input from a power conversion circuit. The digital controller includes a conversion circuit, a modulation circuit and a gating control circuit. The system further includes an analog circuit comprising a filter, a current limiter and a compare circuit. The current limiter is configured to control a magnitude of a current pulled through a power convertor during a device switching operation.

In further embodiments, the digital controller may be configured to receive an AC input from the power conversion circuit, convert the AC input to a digital signal and modulate the digital signal. The analog circuit may be configured to receive modulated signal, filter the modulated signal and provide an average voltage to the current limiter, which sets a Current Reference level ($I_{Reference}$).

In still further embodiments, the compare circuit may compare the reference current ($I_{Reference}$) with a sensed current $I_{Sensed}$ to provide a result. The digital controller may receive the result and determine positive and negative hardware current limit levels for an associated load and controls gating of the power switches based on the result.

In some embodiments, the power conversion circuit may be an uninterruptible power supply (UPS), the conversion circuit may be an analog to digital converter (A/D converter) and the modulation circuit may be a pulse width modulator (PWM).

In further embodiments, the AC input may be one or more of three phase DC rail voltages (DC Rail V), Input Voltages (Input V) and Output Voltages (Output V).

In still further embodiments, the current limiter may be further configured to receive the input; multiply the input by a constant to provide a result, wherein the constant is determined by a slope of a load line; and scale the result by a predetermined value, wherein the predetermined values is based on current limits associated with devices connected to the power system.

In some embodiments, the scaled result may be received by a secondary feed-forward control to increase a speed of the system.

In further embodiments, the current limits may be associated with at least one of a rectifier and an inverter of the power conversion circuit.

Still further embodiments provide current limiters including current limiter circuits configured to control a magnitude of a current pulled through uninterruptible power supply (UPS) during a device switching operation. The current limiter is part of an analog circuit in a power control system, the analog circuit comprising a filter, the current limiter circuit and a compare circuit.

DETAILED DESCRIPTION

Specific exemplary embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

The inventive concept may be embodied as apparatus, methods and computer program products. Some embodiments may be described with reference to block diagrams and/or operational illustrations that illustrate structures and operations. Blocks of the block diagrams and/or operational illustrations may generally implemented using electric circuits configured to perform the specified functions. These "circuits" may generally be implemented using analog and/or digital circuitry. The circuits may include discrete components and/or integrated components, such as data processing integrated circuits (e.g., microprocessors, microcontrollers, digital signal processors and the like) and application-specific integrated circuits (ASICs).

Each block in such diagrams may represent a module, segment, or portion of computer-executable program code for implementing the specified logical function(s). Computer-executable program code may be provided one or more data processors, special purpose processors, ASICs, and/or other programmable data processing apparatus, such that the instructions, which execute to the code to provide the functions/acts specified in the block diagrams and/or operational block or blocks.

These computer-executable program codes may also be stored in a non-transitory medium that may direct a controller circuit to function in a particular manner, such that the program code stored in the non-transitory medium constitute an article of manufacture including instructions that implement the functions specified in the block or blocks of the block diagrams and/or operational illustrations. The non-transitory medium may be, but is not limited to, an electronic, magnetic, optical, electromagnetic, or semiconductor system, apparatus, or device. More specific examples (a non-exhaustive list) of the non-transitory medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

As discussed above, an uninterruptible power supply (UPS) system provides backup power when utility power fails, either long enough for critical equipment to shut down gracefully so that no data is lost, or long enough to keep required loads operational until a generator comes online; and conditions incoming power so that all-too-common sags and surges don't damage sensitive electronic gear. There are many different types of UPSs. For example, single-conversion systems, dual-conversion systems and multi-mode systems, which combine elements of both the single-conversion systems and the dual-conversion systems. The common thread is that all three perform power conversion.

As will be discussed further herein, power conversion systems (power converters) continue to push the envelope of switching frequency, efficiency, and scalability. Today's global environment and power infrastructure demands a wide range of operating voltages and currents when developing a scalable platform. This provides a challenging environment when attempting to design and develop common hardware that provides efficiency and performance. Embodiments of the present inventive concept provide a mechanism for providing tighter limit control for a power converter as will be discussed further below.

Embodiments of the present inventive concept will be discussed with reference to a three phase UPS and a three Level I-type Power Converter. In other words, the power conversion circuit discussed herein is applied to a rectifier and inverter in a three phase UPS. However, it will be understood that embodiments of the present inventive concept are not limited to this configuration. The power conversions systems and methods discussed herein may be used with any type of UPS/power converter without departing from the scope of the present inventive concept.

Furthermore, although embodiments of the present inventive concept are discussed with respect to UPSs, embodiments of the present inventive concept are not limited to this configuration. For example, embodiments of the present inventive concept may be used in any type of power converter, such as variable frequency drives (VFDs).

When the utility generates power, it is at the three-phase level. This type of power is available to almost all commercial and industrial customers, as they are typically large consumers of power. Three-phase power uses three separate "phase" wires, which allow higher power to be delivered to a single point or load. Most homeowners only have single-phase power available to them, as homes are typically small power users. Single-phase power is delivered through either one or two phase wires, which are derived from the utility three-phase power system using transformers.

Single-phase UPSs tend to be a sensible and economical option for simpler, smaller applications with low kVA requirements, which are typically seen in the home, small businesses and in remote or satellite offices where computing power is less than 20,000 VA. Three-phase UPSs are generally the preferred choice for high kVA applications, which are typically more sophisticated and have high compute densities. Large multi-story buildings, data centers and industrial facilities protecting high-power processes are typical three-phase UPS customers, as they need to distribute large amounts of power over relatively long distances.

Figure 1:
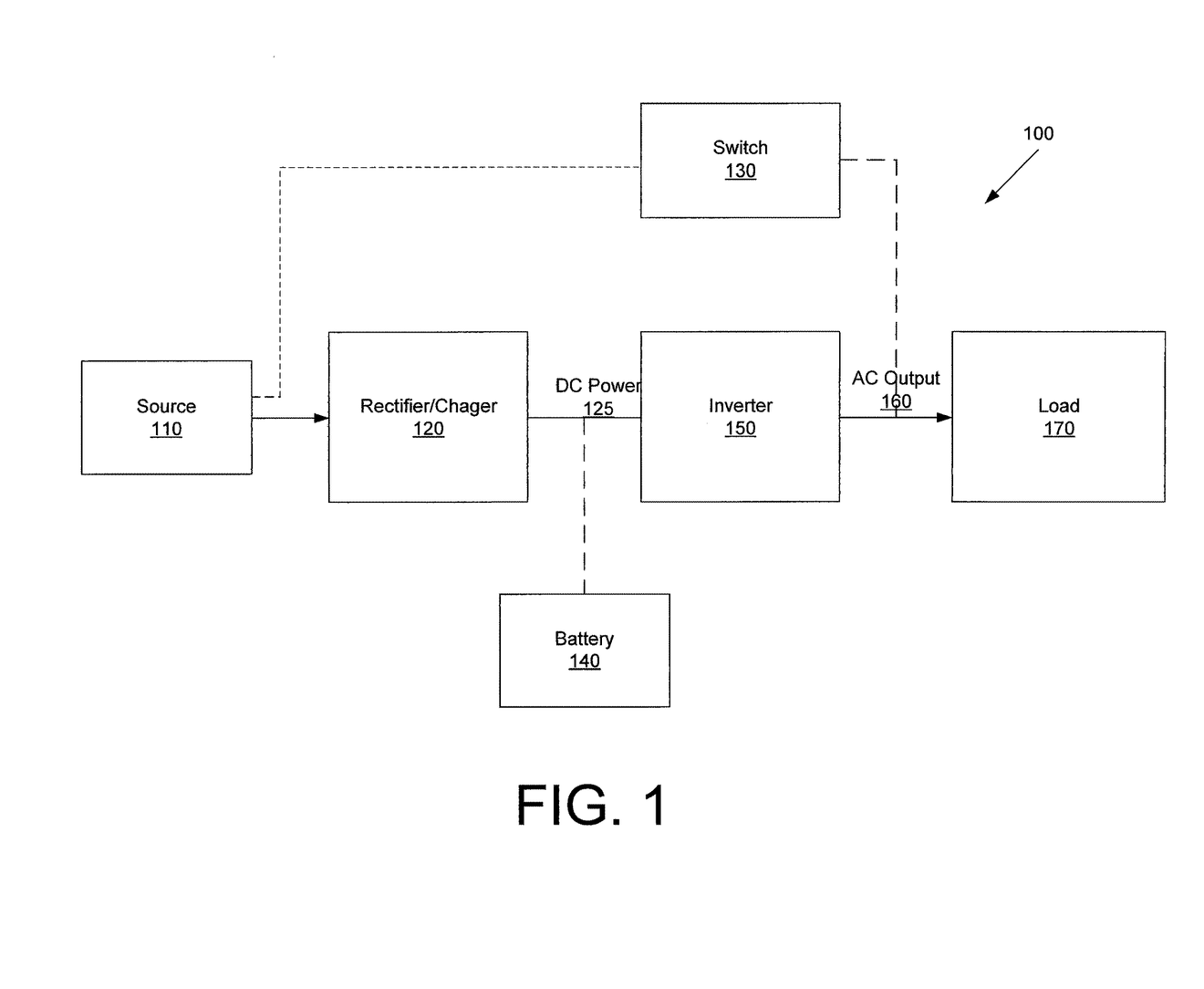
FIG. 1 is a block diagram of a double conversion uninterruptible power supply (UPS).

Referring now to FIG. 1, a block diagram of a UPS 100 will now be discussed. The UPS 100 illustrated in FIG. 1 is a double conversion UPS system. As illustrated, the UPS system 100 includes a power source 110, a rectifier/charger 120, a static switch 130, a battery 140, an inverter 150, output 160 and a load 170. The system 100 of FIG. 1 converts power twice. First, the input rectifier 120 converts alternating current (AC) power from the source 110 into direct current (DC) power 125 and feeds it to an output inverter 150. The output inverter 150 processes the DC power back to AC before sending an AC output 160 to a load 170, for example, information technology (IT) equipment. This double-conversion process may isolate critical loads from raw utility power, increasing the likelihood that the IT equipment receives only clean, reliable electricity.

Referring again to FIG. 1, in normal operation, the double-conversion UPS 100 continually processes power twice. In other words, operations of the UPS 100 proceed as discussed above from the AC source 110 through the rectifier 120 and the inverter 150 to the output 160 for the load 170. However, if the AC input 110 supply falls out of predefined limits, the input rectifier 120 shuts off and the output inverter 150 begins drawing power from the battery 140 instead. The UPS 100 continues to utilize battery power 140 until the AC input 110 returns to normal tolerances or the battery 140 runs out of power, whichever occurs sooner. In case of a severe overload of the inverter 150, or a failure of the rectifier 120/inverter 150, the static switch 130 will be used to bypass the rectifier 120/inverter 150 and support the output loads.

As is understood by those having skill in the art, the "predefined limits" of the source may vary depending on the load 170. Thus, it is desirable to provide a system with adaptable limits such that the system can be used with different types of loads having different voltage and current demands. Accordingly, embodiments of the present inventive concept provide adjustable current limit settings for the rectifier to reduce the likelihood that the device (load) exceeds a safe operating area (SOA). Similarly, embodiments of the present inventive concept maintain a SOA by dynamically adjusting a hardware current limit setting for the inverter. The adjustability of these currents provides enhanced protection versus one single current limit setting, allows operation at higher and lower DC Rail voltages by dynamically adjusting rectifier and inverter hardware current limits to provide enhanced protection; allows for common hardware across multiple platforms and operating conditions, i.e. adaptable for use with multiple load devices having different voltage/current demands and increases robustness and reliability of the power train in a cost effective manner.

To achieve these advantages, embodiments of the present inventive concept provide a digital controller coupled to the inverter/rectifier. As will be discussed further herein with respect to FIGS. 2 through 6, the digital controller is configured to control a gating mechanism for power switches, which may be, for example, insulated-gate bipolar transistor (IGBT) or field effect transistor (FETs) device, but are not limited thereto. As will be discussed, the digital controller controls the magnitude of current that can be pulled through converter inductors during device switching operations. This current along with converter operation voltage, dictates voltage overshoots and operating temperature of power semiconductor devices. For example, typical overshoots may be based on:

$$(Vrail/2) + Lstray*(dI/dt), \quad \text{Eqn. (1)}$$

where Vrail is the voltage on a particular rail, Lstray* is a stray inductance and dI/dt is the change in the current over time. Accordingly, hardware current limits may be reduced at elevated rail operating conditions. This may result in reduced stresses on the power train of the load devices as will be discussed further herein.

It will be understood that the system illustrated in FIG. 1 is provided for example purposes only and that embodiments of the present inventive concept are not limited to this configuration.

Figure 2:
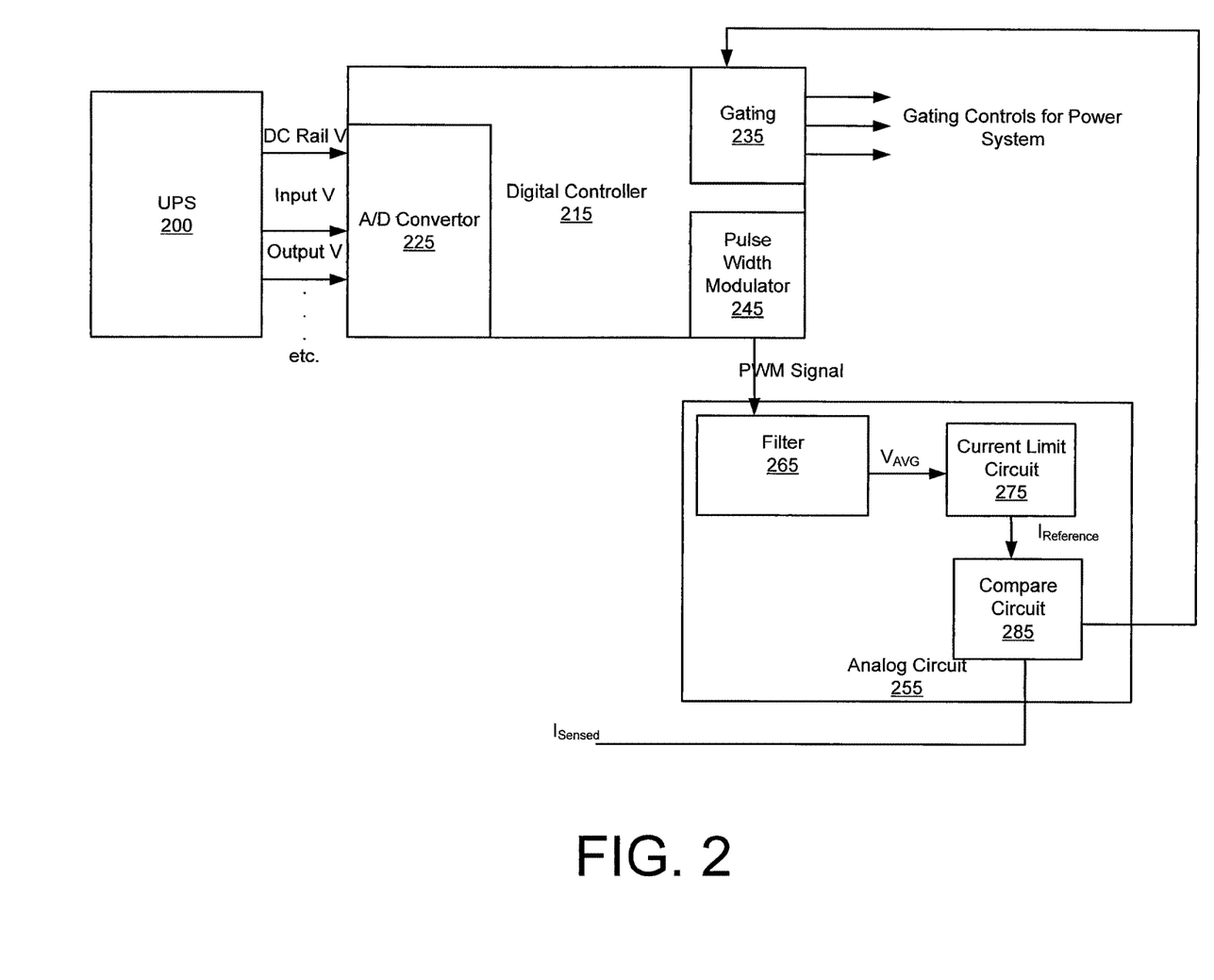
FIG. 2 is a block diagram of a power control system including a digital controller and a current limiter in accordance with some embodiments of the present inventive concept.

Referring now to FIG. 2, a diagram of a system including a digital controller and current limiter in accordance with some embodiments of the present inventive concept will be discussed. As illustrated in FIG. 2, the system includes a UPS 200, a digital controller 215, and an analog circuit 255. As discussed above, the UPS 200 may be any type of UPS compatible with embodiments discussed herein. In some embodiments, the UPS is a three phase UPS. The digital controller 215 may be, for example, a digital signal processor (DSP) or a field programmable gate array (FPGA). As further illustrated, the digital controller 215 includes and analog to digital converter (A/D converter) 225, a pulse width modulator (PWM) 245 and gating control 235 for the power switches. The Analog circuit 255 includes a filter 265, a current limiter 275 and a compare circuit 285. The digital controller 215 controls gating mechanisms for power switches. The current limiter 275 controls a magnitude of current that can be pulled through converter inductors during a device switching operation.

In particular, as illustrated in FIG. 2, the digital controller receives input from the UPS 200, for example, DC rail voltages (DC Rail V), three phase Input Voltages (Input V), Output Voltages (Output V) and the like. The inputs are fed through the A/D converter 225 and then the PWM 245. The digital Controller 215 feeds the pulse width modulated (PWM) signal to analog circuit 225. The analog circuit filters (265) the PWM signal to provide an average voltage ($V_{AVG}$). This average voltage ($V_{AVG}$) is received by the current limiter 275 to set a Current Reference level ($I_{Reference}$). The reference current $I_{Reference}$ is compared (285) with a sensed current $I_{Sensed}$, the result of which is fed back to the digital controller 215 and used to determine positive and negative hardware current limit levels for the particular load and control the gating (235) of the power switches.

It will be understood that the system illustrated in FIG. 2 is provided as an example only and that embodiments of the present inventive concept are not limited to the configuration thereof.

Figure 3:
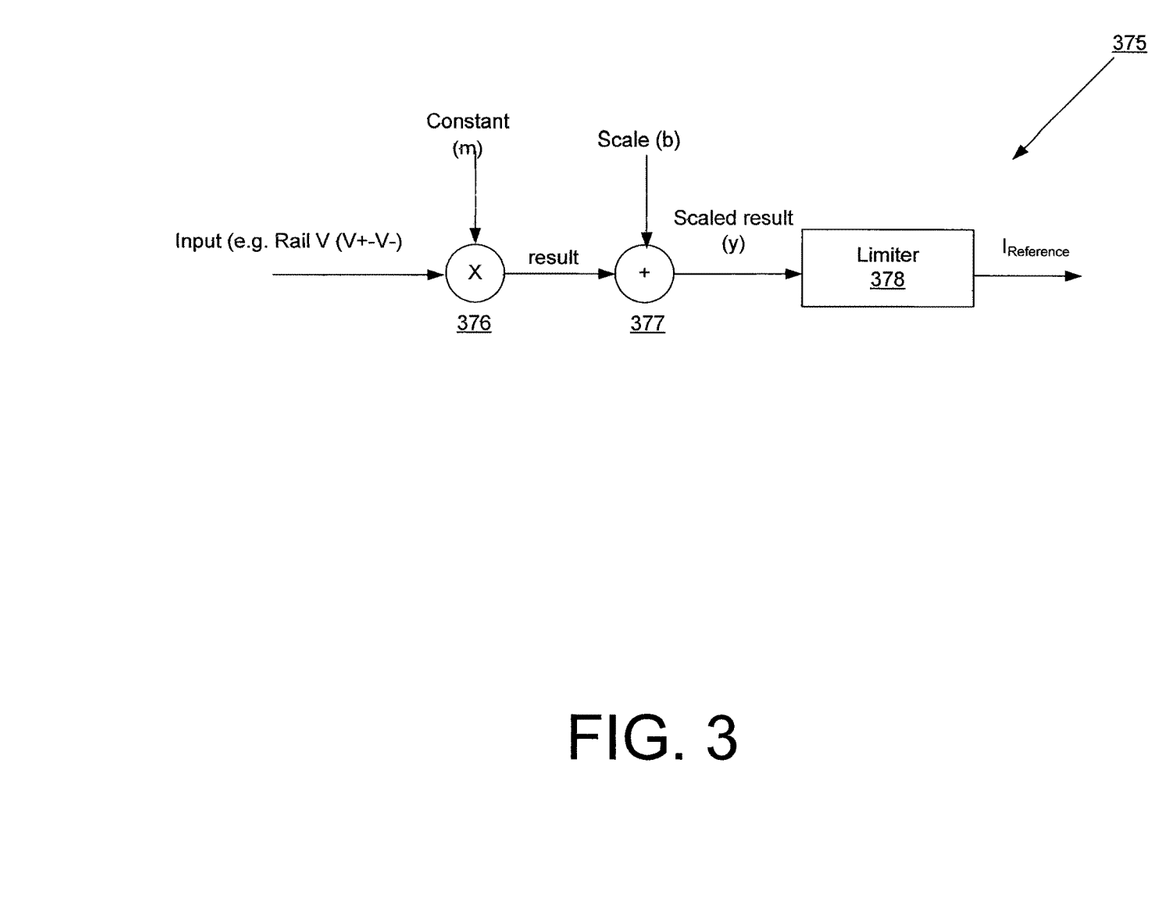
FIG. 3 is a more detailed block diagram of the current limiter of FIG. 2 in accordance with some embodiments of the present inventive concept.

Referring now to FIG. 3, a diagram illustrating embodiments of a current limiter 375 in accordance with some embodiments of the present inventive concept will be discussed. As illustrated in FIG. 3. As discussed above, an input voltage, for example, a Rail Voltage may be used to set a load line or Hardware Current Limit level ($I_{Reference}$) based upon voltage operation. As illustrated in FIG. 3, the current limiter may receive an input (Rail V (V+-V−), which may be multiplied (376) by a constant. In some embodiments, the constant may be determined by a slope of the load line. The result may be scaled (377) by a predetermined value that is based on current limits needed to protect devices connected to the power system. The scaled result is received by the limiter 378, which sets the current limit to protect the devices connected to the system. Thus, embodiments of the present inventive concept may provide an adaptive hardware current limit. This is desirable as not all devices have the same limitations.

Embodiments of the present inventive concept illustrated in FIG. 3 are based on:

$$y = mX + b \quad (2)$$

where y is the scaled result, m is the constant, X is the input and b is the scale. Thus, Eqn. (2) is used to set load line or current that moves with Rail voltage. Accordingly, inverters and rectifiers can operate independently for maximum flexibility. Limits are provided to reduce the likelihood, or possibly prevent, runaway and limit the process. The output of the controller is input to set PWM Duty cycle which controls real device/inductor current limit.

It will be understood that a limiter as discussed herein may be implemented in many forms and still protect devices connected to the system by controlling the current limit. For example, a processor/circuit/module may be configured to perform the functions of the or in some embodiments, the limiter may be implemented by a zener diode without departing from the scope of the present inventive concept.

Figure 4A:
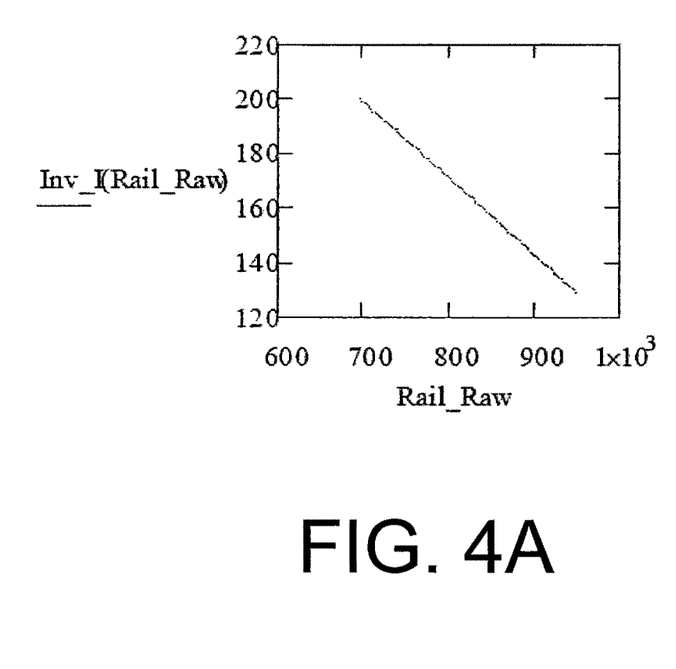
FIGS. 4A and 4B are graphs illustrating load lines in accordance with various embodiments of the present inventive concept.
Figure 4B:
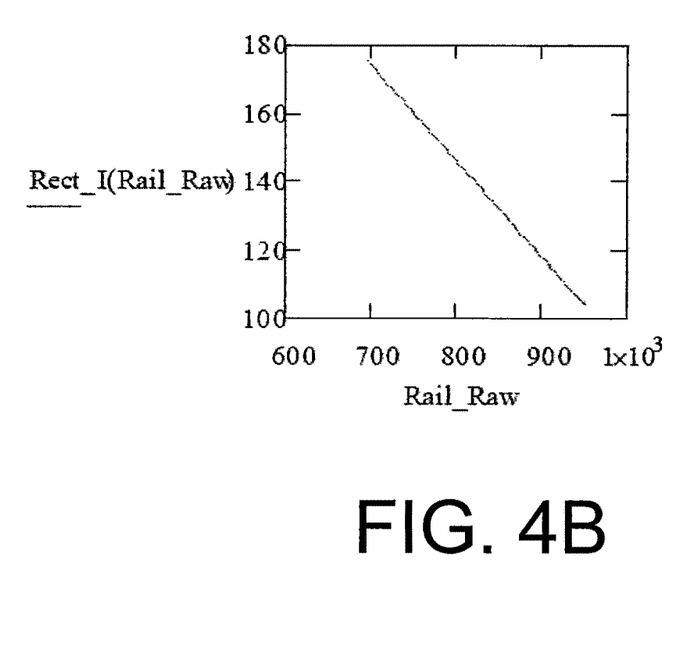
Figure 5:
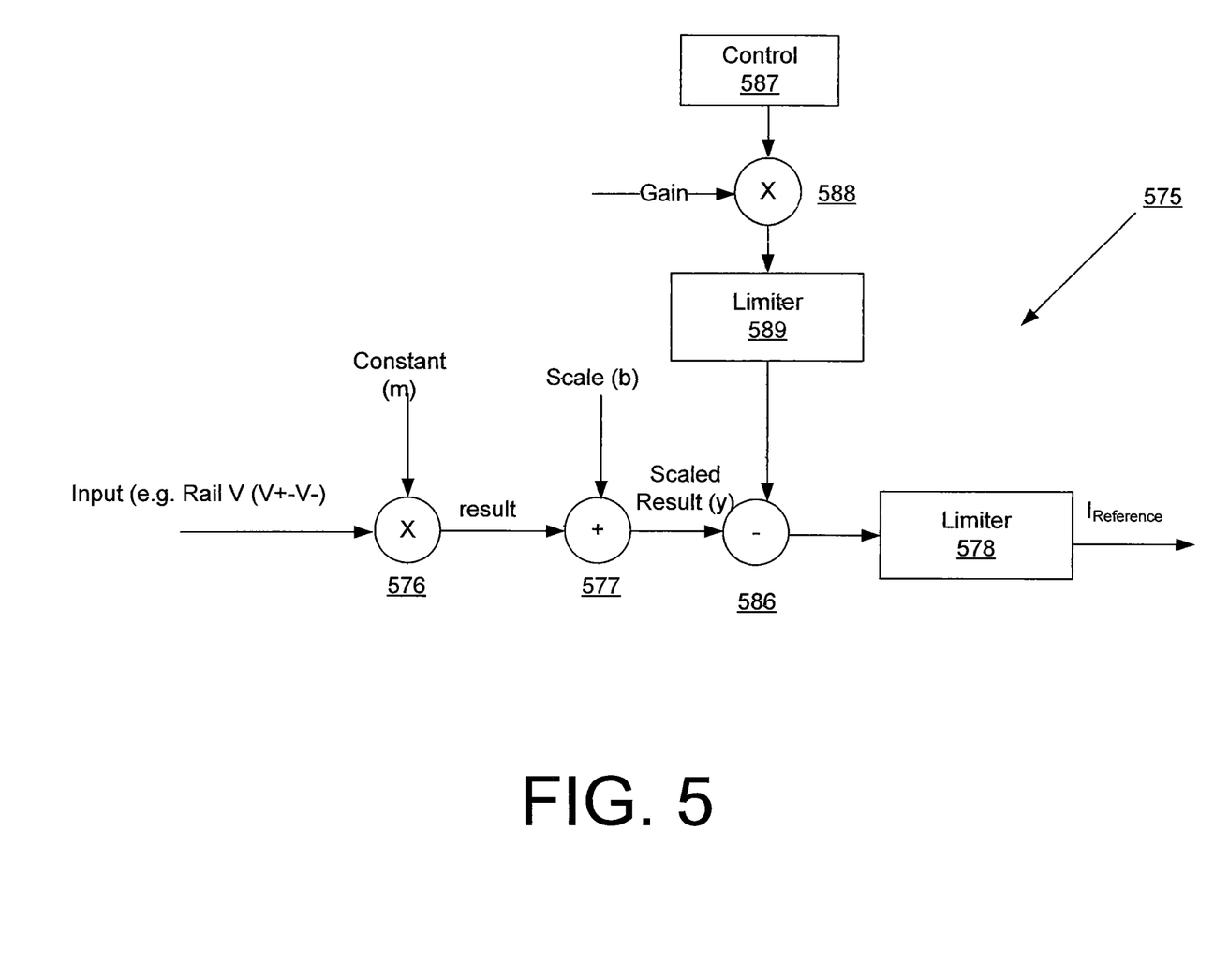
FIG. 5 is a more detailed block diagram of the current limiter of FIG. 2 in accordance with some embodiments of the present inventive concept.

Referring now to FIGS. 4A and 4B, graphs of load lines for both an inverter and a rectifier, respectively, will be discussed. As illustrated in FIGS. 4A and 4B, the separate load lines can be constructed to optimize rectifier and inverter for optimal performance and protection. As illustrated, in FIGS. 4A and 4B there may be different limits for inverters and rectifiers based on Eqn. (2) (y=mX+b) set out above. It will be understood that variable and graphs can change for different embodiments, for example, different power train designs Referring now to FIG. 5, a limiter circuit 575 in accordance with some embodiments of the present inventive concept will be discussed. As illustrated therein, like the circuit 375 of FIG. 3, a voltage, for example, a Rail Voltage, may be used to set a load line or Hardware Current Limit level ($I_{Reference}$) based upon voltage operation. As illustrated in FIG. 5, the current limiter may receive an input (Rail V (V+-V−), which may be multiplied (576) by a constant to provide a result. In some embodiments, the constant may be determined by a slope of the load line. The result may be scaled (577) by a predetermined value to provide a scaled result. The predetermined value may be based on current limits needed to protect devices connected to the power system. However, in embodiments illustrated in FIG. 5, the scaled result is received by a secondary feed-forward control 586. Elements 587, 588, 589 feed into the feed-forward control 586 and increase the speed response of embodiments discussed herein.

Although embodiments illustrated in FIG. 5 use a feed-forward control 586, embodiments of the present inventive concept are not limited to this configuration. For example, a feedback control may be used to achieve similar results without departing from the scope of the resent inventive concept.

As discussed briefly above, embodiments of the present inventive concept provide methods and systems to reduce hardware current limits at elevated rail operating conditions. Reducing hardware current limits at elevated rail operating conditions may result in reduced stresses on the Power Train. Although embodiments of the present inventive concept have been discussed specifically with respect to rail voltages, embodiments of the present inventive concept are not limited to this configuration. For example, a digital controller configured as discussed herein would also know other operating conditions, such as temperature and load conditions. Thus, these other known operating conditions could be used to provide more stable devices. Furthermore, nothing limits embodiments discussed herein to increasing hardware current limit conditions. For example, current limit could increase to improve operation, for example with a load fault or Non-Linear Load pickup.

Figure 6:
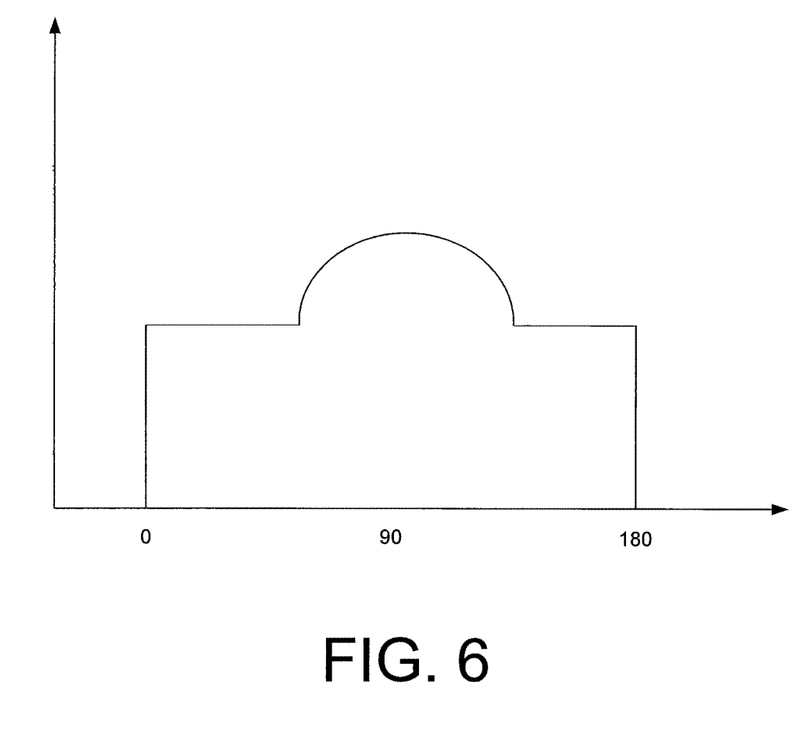
FIG. 6 is a graph illustrating a three phase hardware system in accordance with some embodiments of the present inventive concept.

Referring now to FIG. 6, a graph illustrating further embodiments of the present inventive concept will be discussed. A single or three phase Hardware Current Limit Reference may be modulated to provide higher currents at peaks. This may provide lower average cycle current than a single reference current value, thus providing enhanced thermal protection. Phase shift can also be controlled based on load parameters.

In the drawings and specification, there have been disclosed example embodiments of the inventive concept. Although specific terms are employed, they are used in a generic and descriptive sense only and not for purposes of limitation, the scope of the inventive concept being defined by the following claims.

That which is claimed:

1. A power control system, the system comprising:
a digital controller configured to control gating mechanisms for power switches responsive to an input from a power conversion circuit, the digital controller comprising a conversion circuit, a modulation circuit and a gating control circuit; and
an analog circuit comprising a filter, a current limiter and a compare circuit, the current limiter being configured to control a magnitude of a current pulled through a power convertor during a device switching operation,
wherein the current limiter is further configured to:
receive the input;
multiply the input by a constant to provide a result, wherein the constant is determined by a slope of a load line; and
scale the result by a predetermined value, wherein the predetermined values is based on current limits associated with devices connected to the power system.

2. The system of claim 1:
wherein the digital-controller is configured to receive an AC input from the power conversion circuit, convert the AC input to a digital signal and modulate the digital signal; and
wherein the analog circuit is configured to receive-modulated signal, filter the modulated signal and provide an average voltage to the current limiter, which sets a Current Reference level ($I_{Reference}$).

3. The system of claim 2:
wherein the compare circuit compares the reference current ($I_{Reference}$) with a sensed current $I_{Sensed}$ to provide a result; and
wherein the digital controller receives the result and determines positive and negative hardware current limit levels for an associated load and controls gating of the power switches based on the result.

4. The system of claim 1, wherein the power conversion circuit comprises an uninterruptible power supply (UPS), the conversion circuit comprises an analog to digital converter (A/D converter) and the modulation circuit comprises a pulse width modulator (PWM).

5. The system of claim 2, wherein the AC input comprises one or more of three phase DC rail voltages (DC Rail V), Input Voltages (Input V) and Output Voltages (Output V).

6. The system of claim 1, wherein the scaled result is received by a secondary feed-forward control to increase a speed of the system.

7. The system of claim 6, wherein the current limits are associated with at least one of a rectifier and an inverter of the power conversion circuit.

8. A current limiter comprising a current limiter circuit configured to control a magnitude of a current pulled through uninterruptible power supply (UPS) during a device switching operation, the current limiter being part of an analog circuit in a power control system, the analog circuit comprising a filter, the current limiter circuit and a compare circuit, wherein the current limiter is further configured to:
receive an input;
multiply the input by a constant to provide a result, wherein the constant is determined by a slope of a load line; and
scale the result by a predetermined value, wherein the predetermined values is based on current limits associated with devices connected to the power system.

9. The current limiter of claim 8, wherein the analog circuit in the power control system communicates with a digital controller in the power control system, the digital controller being configured to control gating mechanisms for power switches responsive to an input from the UPS, the digital controller comprising a conversion circuit, a modulation circuit and a gating control circuit.

10. The current limiter of claim 9:
wherein the digital controller is configured to receive an AC input from the UPS, convert the AC input to a digital signal and modulate the digital signal; and
wherein the analog circuit is configured to receive modulated signal, filter the modulated signal and provide an average voltage to the current limiter, the current limiter being further configured to set a Current Reference level ($I_{Reference}$).

11. The current limiter of claim 10:
wherein the compare circuit compares the reference current ($I_{Reference}$) with a sensed current $I_{Sensed}$ to provide a result; and
wherein the digital controller receives the result and determines positive and negative hardware current limit levels for an associated load and controls gating of the power switches based on the result.

12. The current limiter of claim 9, wherein the conversion circuit comprises an analog to digital converter (A/D converter) and the modulation circuit comprises a pulse width modulator (PWM).

13. The current limiter of claim 9, wherein the AC input comprises one or more of three phase DC rail voltages (DC Rail V), Input Voltages (Input V) and Output Voltages (Output V).

14. The current limiter of claim 8, wherein the scaled result is received by a secondary feed-forward control to increase a speed of the system.

15. The current limiter of claim 14, wherein the current limits are associated with at least one of a rectifier and an inverter of the UPS.

* * * * *